April 20, 1943.   O. A. JOHNSON   2,317,274
ROTARY FEEDER
Filed July 10, 1940

Inventor
OSCAR A. JOHNSON
By Albert G. Blodgett
Attorney

Patented Apr. 20, 1943

2,317,274

UNITED STATES PATENT OFFICE 2,317,274

ROTARY FEEDER

Oscar A. Johnson, Worcester, Mass., assignor to Riley Stoker Corporation, Worcester, Mass., a corporation of Massachusetts Application July 10, 1940, Serial No. 344,768

4 Claims. (Cl. 221—106)

This invention relates to rotary feeders, and more particularly to apparatus of the type comprising a rotary drum having pockets in its periphery and arranged to feed granular material at a controlled rate.

Feeders of this general type have been used for supplying coal to pulverizers, and since foreign objects such as bolts, spikes, etc. are sometimes mingled with the coal, it has been proposed to mount a yieldable apron adjacent the periphery of the drum. This apron is adapted to yield and thereby avoid breakage of the parts in the event a foreign body becomes wedged between the drum and apron. It is found however that when the apron yields it will allow large quantities of the coal to pass the drum by the action of gravity as well as the suction effect of the pulverizer. This flooding of the pulverizer is highly undesirable, particularly when it is used for the direct firing of a furnace, since the combustion conditions are seriously affected.

It is accordingly one object of the invention to overcome these difficulties and to provide a rotary feeder which will be safe from damage by hard foreign bodies and free from tendency to flood.

It is a further object of the invention to provide a rotary feeder which will be thoroughly reliable in operation and particularly adapted for the feeding of coal to a pulverizer.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a vertical section through a rotary feeder, taken on the line 1—1 of Fig. 2;

Figure 2:
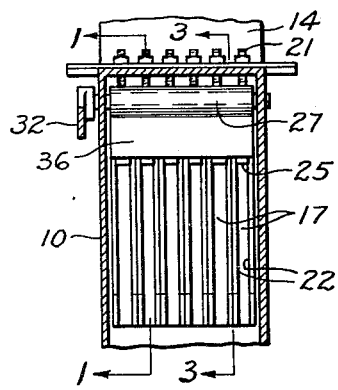
Fig. 2 is a section on the line 2—2 of Fig. 1.
Figure 3:
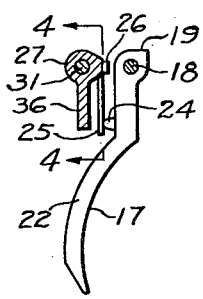
Fig. 3 is a fragmentary section on the line 3—3 of Fig. 2.
Figure 4:
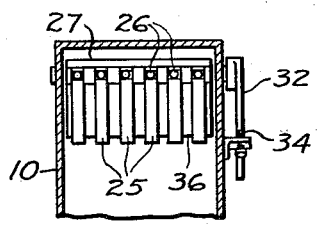
Fig. 4 is a section on the line 4—4 of Fig. 3.
Figure 1:
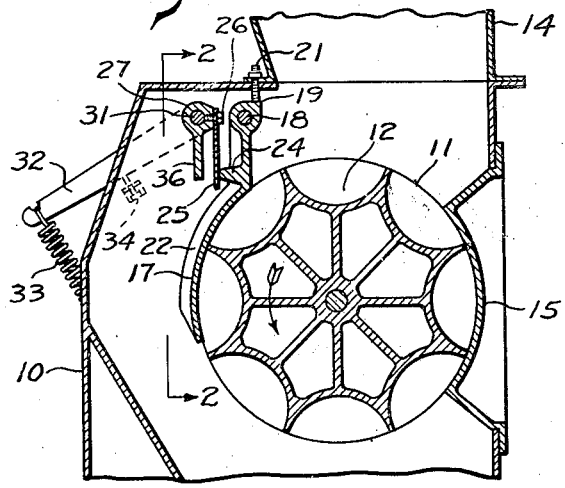

The embodiment illustrated comprises a hollow casing 10 with a drum 11 mounted therein for rotation about a horizontal axis. The drum is rotated in a counter-clockwise direction, as viewed in Fig. 1, by any suitable means (not shown). The peripheral portion of the drum is formed with a series of circumferentially spaced pockets 12 which are adapted to be filled with material by gravity from a hopper 14 located above the drum. This material will be discharged from the pockets by gravity as they approach their lowermost positions during the rotation of the drum. A curved plate 15 is mounted on the casing adjacent the up-running portion of the drum and conforms closely to the periphery thereof to form a seal and prevent leakage of material downwardly between the drum and casing. This plate preferably extends circumferentially for a distance somewhat exceeding the width of one pocket, so that a seal will always be maintained.

Adjacent the down-running portion of the drum there is provided a series of comparatively narrow fingers 17 arranged side by side and having arcuate portions concentric with the drum and located close to the periphery of the drum. The arcuate portions of the fingers extend in a circumferential direction for a distance somewhat greater than the width of one pocket, to ensure a proper seal. The fingers are so mounted that they may yield independently in a direction outwardly from the drum, and for this purpose they are pivotally supported at their upper ends on a horizontal shaft 18 mounted in the casing. Each finger is provided with a shoulder 19 arranged to engage a screw 21 in the upper wall of the casing and thus limit its inward movement, so that actual rubbing contact between the drum and the fingers may be avoided. Each finger is provided with two outwardly projecting flanges 22 which extend along its opposite sides, the flanges on adjacent fingers being substantially in contact to form a seal between the fingers even when they swing out of alignment.

The fingers are urged inwardly toward the drum in such a manner that each individual finger may yield outwardly independently of the others. For this purpose each finger is formed with a lug 24 which extends outwardly from the upper portion of the finger, somewhat below the shaft 18. Each lug engages the lower portion of a small cantilever spring 25, the upper portions of the springs being attached by means of screws 26 to a horizontal member 27 which extends parallel with the shaft 18.

Figure 5:
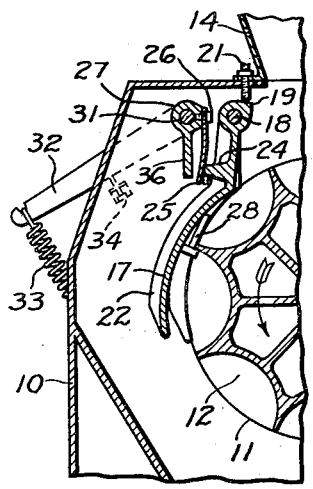
Fig. 5 is a view similar to Fig. 1 showing the effect of a small foreign body.

The springs 25 will yield sufficiently to permit the passage through the feeder of comparatively small foreign bodies, such as the bolt 28 shown in Fig. 5. However, if a comparatively large foreign body, such as the block 29 shown on Fig. 6, should become lodged between the drum and one of the fingers 17, the corresponding spring would be deflected so greatly as to be over-stressed unless some provision were made to avoid such an occurrence. For this reason the member 27 is secured to a horizontal shaft 31 rotatably supported by the casing and carrying on one end an arm 32 located outside the casing. A coiled tension spring 33 is connected to the arm, and downward movement of the arm under the pull of the spring is limited by an adjustable stop screw 34.

Along the bottom of the member 27 there is provided a depending flange 36 which is normally spaced outwardly from the springs 25 and forms an abutment which positively limits the deflection of these springs.

Figure 6:
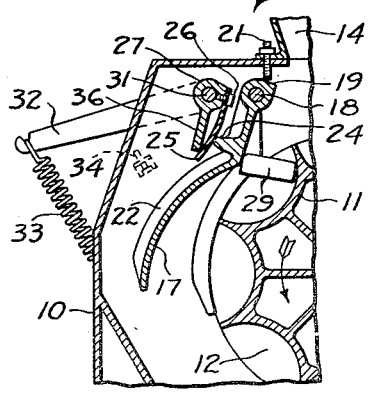
Fig. 6 is a view similar to Fig. 1 showing the effect of a large foreign body.

The operation of the invention will now be apparent from the above disclosure. The screw 34 will be so adjusted that with the arm 32 held against the same by the spring 33, the springs 25 will be slightly stressed, urging the fingers 17 inwardly to their limiting positions as determined by the screws 21. The pockets 12 in the upper portion of the drum 11 will be filled with materal from the hopper 14, and the rotation of the drum will carry this material downwardly past the fingers 17, the material thereupon falling from the pockets by gravity. If a hard lump of material or a foreign body should project above the periphery of the drum into engagement with one of the fingers 17, this finger will yield outwardly against its spring 25, as shown in Fig. 5. The other fingers will remain in their normal positions, so that there will be no flooding of the material from the hopper past the drum. In the event an unusually large foreign body enters the feeder, one or more of the springs 25 may be deflected sufficiently to engage the flange 36, as shown in Fig. 6, forcing the member 27 and shaft 31 to turn in a clockwise direction and lifting the arm 32 in opposition to the spring 33. This will avoid damage to the various parts and allow the foreign body to pass through readily.

Having thus described my invention, what I claim as new and desire to secure by Letters Patent is:

1. A feeder comprising a substantially horizontal rotary drum having a plurality of pockets in its periphery, means to supply material to the upper portion of the drum, a series of fingers arranged side by side adjacent the down-running portion of the drum to form a seal, means supporting said fingers for movement toward and away from the drum, a member located adjacent the fingers and movable independently thereof, a series of springs connecting the fingers with the member and urging the fingers yieldably toward the drum, and means yieldably restraining said member against movement under the influence of the loading of said springs.

2. A feeder comprising a substantially horizontal rotary drum having a plurality of pockets in its periphery, means to supply material to the upper portion of the drum, a series of fingers arranged side by side adjacent the down-running portion of the drum to form a seal, means supporting said fingers for movement toward and away from the drum, a member located adjacent the fingers and movable independently thereof, a series of springs connecting the fingers with the member and urging the fingers yieldably toward the drum, means on said member to limit the deflection of the springs, and means yieldably restraining said member against movement under the influence of the loading of said springs.

3. A feeder comprising a substantially horizontal rotary drum having a plurality of pockets in its periphery, means to supply material to the upper portion of the drum, a series of fingers arranged side by side adjacent the down-running portion of the drum to form a seal, means supporting said fingers for movement toward and away from the drum, a member pivotally supported adjacent said fingers about an axis parallel with the axis of the drum, a series of cantilever springs secured to said member and each engaging one of the fingers to urge the same yieldably toward the drum, and means yieldably restraining the pivotal movement of said member under the influence of the loading of the springs.

4. A feeder comprising a substantially horizontal rotary drum having a plurality of pockets in its periphery, means to supply material to the upper portion of the drum, a series of fingers arranged side by side adjacent the down-running portion of the drum to form a seal, means supporting said fingers for movement toward and away from the drum, a member pivotally supported adjacent said fingers about an axis parallel with the axis of the drum, a series of cantilever springs secured to said member and each engaging one of the fingers to urge the same yieldably toward the drum, an abutment on said member in a position to limit the deflection of the springs, and means yieldably restraining the pivotal movement of said member under the influence of the loading of the springs.

OSCAR A. JOHNSON.